(12) United States Patent
Grover

(10) Patent No.: US 7,455,348 B1
(45) Date of Patent: Nov. 25, 2008

(54) CAB TOP CARRIER/DEFLECTOR FOR FIFTH WHEEL TOW VEHICLES

(76) Inventor: Donald J Grover, 446 Cedar Ct., Taylors Falls, MN (US) 55084

( * ) Notice: Subject to any disclaimer, the term of this patent is extended or adjusted under 35 U.S.C. 154(b) by 16 days.

(21) Appl. No.: 11/633,372

(22) Filed: Dec. 4, 2006

(51) Int. Cl.
*B60J 1/00* (2006.01)

(52) U.S. Cl. ............... 296/180.1; 296/180.2; 296/180.3

(58) Field of Classification Search ............. 296/180.1, 296/180.2, 137.2, 37.7, 137.1
See application file for complete search history.

(56) References Cited

U.S. PATENT DOCUMENTS

| | | | | |
|---|---|---|---|---|
| 3,006,519 A * | 10/1961 | Doane | .................. | 224/328 |
| 3,163,995 A * | 1/1965 | Maier | .................. | 165/44 |
| 3,794,372 A * | 2/1974 | Webb | .................. | 296/180.3 |
| 3,866,968 A * | 2/1975 | Donahue | .................. | 296/180.4 |
| 4,022,508 A * | 5/1977 | Kirsch et al. | .................. | 296/180.4 |
| 4,036,519 A * | 7/1977 | Servais et al. | .................. | 296/180.2 |
| 4,082,340 A * | 4/1978 | Taylor | .................. | 296/180.3 |
| 4,087,124 A * | 5/1978 | Wiley, Jr. | .................. | 296/180.3 |
| 4,141,580 A * | 2/1979 | Ivan | .................. | 296/180.2 |
| 4,156,543 A * | 5/1979 | Taylor et al. | .................. | 296/180.3 |
| 4,214,786 A * | 7/1980 | Morrison | .................. | 296/180.2 |
| 4,217,764 A * | 8/1980 | Armbruster | .................. | 62/323.1 |
| 4,245,862 A * | 1/1981 | Buckley, Jr. | .................. | 296/180.3 |
| 4,290,639 A * | 9/1981 | Herpel | .................. | 296/180.3 |
| 4,308,983 A * | 1/1982 | Yoshida | .................. | 296/180.5 |
| 4,313,635 A * | 2/1982 | Front | .................. | 296/180.3 |
| 4,375,898 A * | 3/1983 | Stephens | .................. | 296/180.3 |
| 4,437,698 A * | 3/1984 | Tantalo | .................. | 296/180.3 |
| 4,470,628 A * | 9/1984 | Husted | .................. | 296/180.3 |
| 4,567,734 A * | 2/1986 | Dankowski | .................. | 62/186 |
| 4,607,874 A * | 8/1986 | Peairs | .................. | 296/180.3 |
| 4,611,796 A * | 9/1986 | Orr | .................. | 296/180.2 |
| 4,779,915 A * | 10/1988 | Straight | .................. | 296/180.3 |
| 4,904,015 A * | 2/1990 | Haines | .................. | 296/180.3 |
| 4,957,325 A * | 9/1990 | Engel | .................. | 296/180.2 |
| 5,078,448 A * | 1/1992 | Selzer et al. | .................. | 296/180.2 |
| 5,265,435 A * | 11/1993 | Richardson | .................. | 62/133 |
| 5,317,880 A * | 6/1994 | Spears | .................. | 296/180.3 |
| 5,429,411 A * | 7/1995 | Spears | .................. | 296/180.1 |
| 5,513,894 A * | 5/1996 | Ragsdale | .................. | 296/180.2 |
| 5,536,062 A * | 7/1996 | Spears | .................. | 296/180.3 |
| 5,595,419 A * | 1/1997 | Spears | .................. | 296/180.2 |
| 5,653,493 A * | 8/1997 | Spears | .................. | 296/180.2 |
| 5,876,088 A * | 3/1999 | Spears | .................. | 296/180.5 |
| 6,099,069 A * | 8/2000 | Spears | .................. | 296/180.2 |
| 6,183,041 B1 * | 2/2001 | Wilson | .................. | 296/180.1 |
| 6,422,034 B2 * | 7/2002 | Gehman et al. | .................. | 62/507 |
| 7,121,614 B2 * | 10/2006 | Kawai | .................. | 296/180.2 |

* cited by examiner

*Primary Examiner*—Kiran B. Patel
(74) *Attorney, Agent, or Firm*—Michael I. Kroll

(57) ABSTRACT

A cab top carrier/deflector device for fifth wheel tow vehicles that is removably installed on the cab of such a tow vehicle and includes a plurality of selectively adjustable deflector elements to redirect the air stream as it travels over the cab of the tow vehicle to drag created from said air stream flowing against the lead portion of the trailer. The present invention further includes a cargo storage chamber within the interior of the housing that is accessible by access doors disposed on the sides thereof.

6 Claims, 7 Drawing Sheets

CAB TOP CARRIER/DEFLECTOR FOR FIFTH WHEEL TOW VEHICLES

BACKGROUND OF THE INVENTION

1. Field of the Invention

Figure 1:
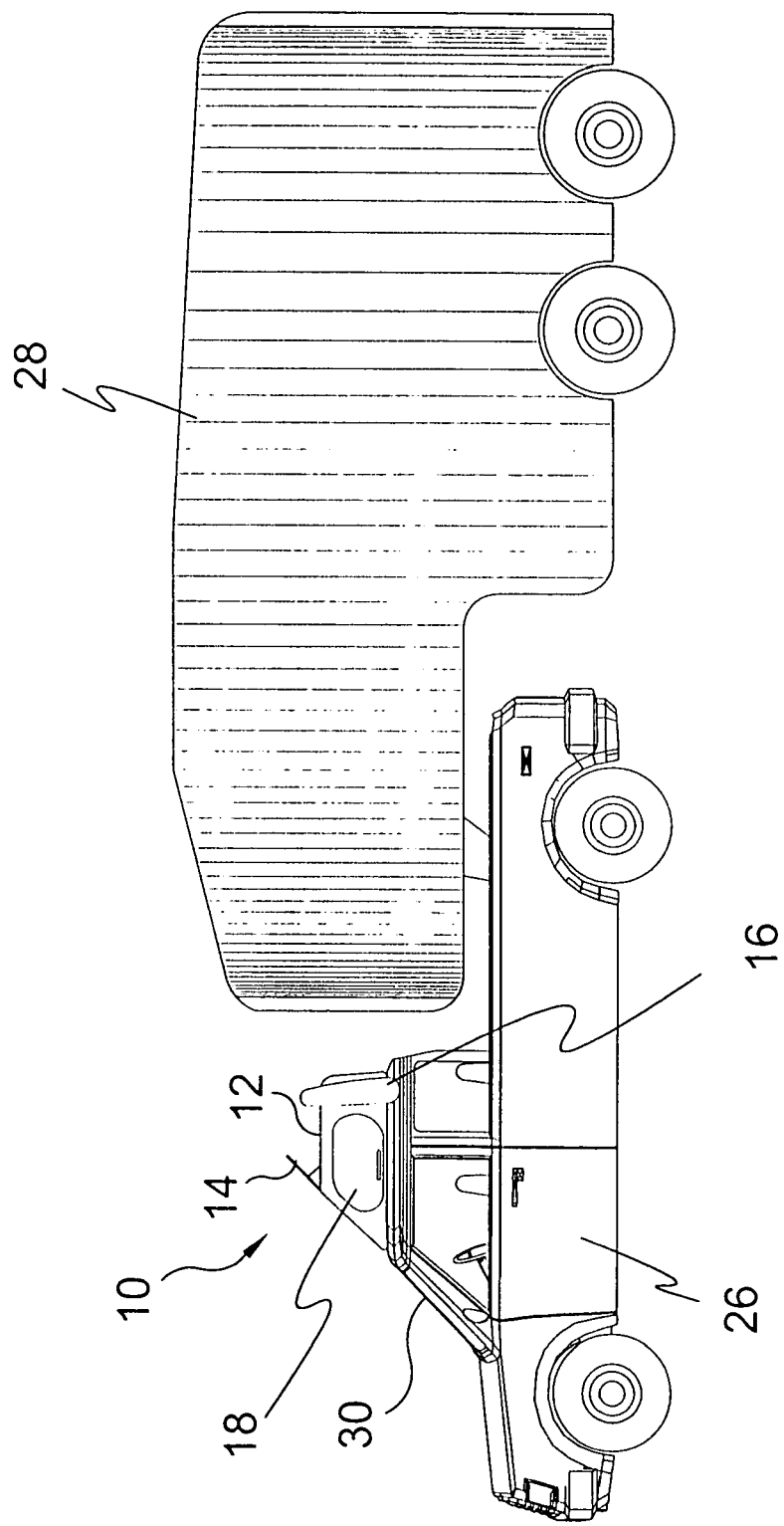

The present invention relates generally to car top carriers and, more specifically, to a car top carrier having aerodynamic properties and a plurality of wind deflector elements disposed thereon. The car top carrier/deflector of the present invention is for use with fifth wheel tow vehicles and serves to direct air flow over and around the object being towed.

Fifth wheel tow vehicles are usually pickup trucks having a fifth wheel hitch disposed on the bed. The height differential between the top of the tow vehicle cab and that of the towed fifth wheel travel trailer presents a great deal of aerodynamic drag against the towed object thereby compromising the performance of the towing vehicle.

The present invention is selectively secured to the cab top of the vehicle and includes a top deflector and two side deflectors to direct air flow over and around the trailer. Interchangeable pitch braces enable the user to adjust the pitch of each deflector accordingly. The interior of the present invention is substantially hollow and includes at least one access door to enable the interior to be used to store and secure cargo.

2. Description of the Prior Art

There are other devices designed for air deflection. Typical of these is U.S. Pat. No. 4,087,124 issued to Wiley, Jr. on May 2, 1978.

Another patent was issued to Yoshida on Jan. 5, 1978 as U.S. Pat. No. 4,308,983. Yet another U.S. Pat. No. 4,420,105 was issued to Nepper on Dec. 13, 1983 and still yet another was issued on Jul. 3, 1990 to Hallsen as U.S. Pat. No. 4,938,398.

Another patent was issued to Burgess, et al. on Dec. 7, 1999 as U.S. Pat. No. 5,996,867. Yet another U.S. Pat. No. 6,338,524 was issued to Wu on Jan. 15, 2002. Another was issued to Bauer, et al. on May 13, 2003 as U.S. Pat. No. 6,561,397 and still yet another was issued on 6,772,926 to Eichele, et al. as U.S. Pat. No. 6,772,926.

Another patent was issued to Argent on Jul. 8, 1959 as U.K. Patent No. GB816323. Yet another French Patent No. FR2695890 was issued to Brand on Mar. 25, 1994. Another was issued to Holger on Jun. 27, 2002 as German Patent No. DE 10063769.

U.S. Pat. No. 4,087,14

Inventor: Wiley, Jr.

Issued: May 2, 1978

By providing a wind deflecting panel with illuminating devices mounted thereto and an information bearing overlay positioned in spaced juxtaposition to said illuminating devices, an illuminated drag reducer is provided. In this manner, advertising messages or warnings can be provided on the overlay for both daytime and nighttime visibility.

U.S. Pat. No. 4,308,983

Inventor: Yoshida

Issued: Jan. 5, 1982

A carrier for a motor vehicle including a planar, curved supporting member which is substantially the same size of the roof of the motor vehicle, a plurality of ribs formed integrally on the undersurface of the supporting member for reinforcing the supporting member and for spacing the supporting member from the roof of the motor vehicle, means for coupling the supporting member to the motor vehicle and a visor movable between an up-position and a down-position. When the visor is on the up-position, wind flow is allowed to pass through the space between the carrier and the roof of the motor vehicle and when the visor is on the down-position, wind flow will be shut-off. Thus, wind flow can be controllable based upon the weather condition.

U.S. Pat. No. 4,420,105

Inventor: Nepper

Issued: Dec. 13, 1983

A flexible hinge and closure member for a luggage carrier is described wherein the carrier comprises a lower portion including a bottom, front and back walls, and opposite side walls. The upper portion is removably mounted on the lower portion and includes a top, front and back walls, and opposite side walls. An elongated flexible member detachably hingedly secures the lower end of the side walls of the upper portion to the upper end the side walls of the lower portion. When it is desired to open the luggage carrier, one of the flexible members is removed to permit the upper portion to be pivotally moved upwardly with respect to the lower portion about the other flexible member.

U.S. Pat. No. 4,938,398

Inventor: Hallsen

Issued: Jul. 3, 1990

A storage box adapted for mounting behind the wheel wells and the tailgate in a pick-up truck bed includes a planar base extending between bottom edges of a pair of generally vertical side walls. Each of the side walls have intersecting obliquely inclined top edge portions. A front wall of the storage box is formed by a rectangular planar panel extending in an obliquely inclined orientation between the top edge portions of the vertical side walls. A cover is formed by a planar rectangular panel which is pivotally secured to an upper edge of the front wall and is dimensioned to abut the top edge portions of the vertical side walls when in a closed position. A rear end opening of the storage box is defined by the planar base, the vertical side walls and the cover. The rear end opening is dimensioned to be opened and closed by the existing vehicle tailgate. A removable rear end panel may be inserted in aligned vertical guide tracks secured on opposite interior surfaces of the vertical side walls to close the rear end opening. The cover includes a locking mechanism to secure the cover in a closed position, covering the guide tracks to prevent removal of the rear end panel. The inclined front wall and cover forms an air foil to direct air flow smoothly over the vehicle tailgate to improve gas mileage.

U.S. Pat. No. 5,996,867

Inventor: Burgess, et al.

Issued: Dec. 7, 1999

An air deflecting cargo shield is provided including a vehicle with a roof. The roof has a mounting mechanism for carrying a load such a ladder. A shield is mounted to a front extent of the roof of the vehicle. A retractable canvas assembly is situated adjacent to a top of the shield.

U.S. Pat. No. 6,338,524

Inventor: Wu

Issued: Jan. 15, 2002

An automotive aerodynamic component and object carrier fixture is installed on the top of an automobile with an inclination adjustable according to the handling style of the driver. During normal utilization, the aerodynamic component is mounted level to provide a low air resistance. When the aerodynamic component is adjusted such that it is mounted at a forward inclination, downward pressure is generated which increases the weight of the vehicle to increase tracking over the ground. When the aerodynamic component is adjusted such that it is mounted at an upward inclination, a lifting force is generated that decreases the weight of the vehicle to achieve lower fuel consumption, faster acceleration, and more responsive braking performance. A vertical wing is provided to increase directional stability.

U.S. Pat. No. 6,561,397

Inventor: Bauer, et al.

Issued: May 13, 2003

A retractable carrier system (10) is provided for carrying luggage and other objects on the roof of a vehicle. The carrier system (10), which may be original equipment on the vehicle or an after market addition, includes a collapsible container (20), a reel (50) onto which the collapsible container (20) may be rolled and a storage compartment (70).

U.S. Pat. No. 6,772,926

Inventor: Eichele, et al.

Issued: Aug. 10, 2004

A retractable carrier system (10) is provided for carrying luggage and other objects on the roof of a vehicle. The carrier system (10), which may be original equipment on the vehicle or an after market addition, includes a collapsible container (20), a reel (50) onto which the collapsible container (20) may be rolled and a storage compartment (70).

U.K. Patent Number GB816,323

Inventor: William John Argent

Issued: Jul. 8, 1959

A luggage rack for the roof of a motor vehicle comprises a rectangular metal bar frame of a size suitable to form a bed or coach frame, the frame having cross bars 24 to act as base members for baggage, adjustable to members 14 being connected to the side bars 1 of the frame and having ends shaped to hook over external and internal parts of the vehicle, the members 14 acting as suspension members for the frame when it is reversed and used inside the vehicle as a bed or couch frame. The side bars have legs 10 carrying rubber feet 11 for engagement with the roof of the vehicle. Stretched across the frame is an assembly of links or wires 4, and tension springs 5, on which is placed a mattress when the article is used as a bed. The side bars 1 are welded to extension bars 6 and bowed tubes 7 to form side fences for luggage, and the front of the rack has a fairing in the form of two side panels 22 and a control panel 23 to act as a weather guard. The crossbars 24 are pivotally connected to struts 9 for the side fences so that when the rack is reversed and suspended for use as a bed frame the crossbars may be swung about their pivots away from the frame.

French Patent Number FR 2695890

Inventor: Jean-Luc Brard

Issued: Mar. 25, 1994

The vehicle roof rack provides both front (4) and rear (6) aerodynamic spoilers, which are each securable to the roof (2) of the vehicle (3). The two spoilers are linked together by a single central beam (7), which is arranged on the longitudinal axis of the vehicle. The rear spoiler is produced in two parts, one part being fixed to the vehicle roof while the other part is rotatably movable. This allows the load to be carried on the rack, located and secured in place. The moving part can then be locked in place on the central beam. ADVANTAGE—It retains the aerodynamic form and improves the integration of the roof rack into the vehicle shape.

German Patent Number DE 10063769

Inventor: Fitterer Holger

Issued: Jun. 27, 2002

The luggage container for mounting on a rack on a car roof has parallel upper (16) and lower (15) sides. Its front end slopes forward below the level of the underside and is connected by an upwardly-sloping section to it, so that the effect of the slipstream from the roof is reduced.

While these carrier/deflector devices may be suitable for the purposes for which they were designed, they would not be as suitable for the purposes of the present invention, as hereinafter described.

SUMMARY OF THE PRESENT INVENTION

A primary object of the present invention is to provide a portable air deflector device for installation on fifth wheel tow vehicles that directs air flow over and around the trailer to reduce drag and increase efficiency.

Another object of the present invention is to provide a portable air deflector device having a plurality of deflector elements wherein the user can selectively adjust the angular displacement thereof to redirect air flow accordingly.

Yet another object of the present invention is to provide a portable air deflector device that has a substantially hollow interior.

Still yet another object of the present invention is to provide a portable air deflector device having at least one access door to the interior portion thereof to enable the user to store and transport cargo therein.

Another object of the present invention is to provide a portable air deflector and carrier device that is simple and easy to use.

Yet another object of the present invention is to provide a portable air deflector and carrier device that is inexpensive to manufacture and operate.

Additional objects of the present invention will appear as the description proceeds.

The present invention overcomes the shortcomings of the prior art by providing a cab top carrier/deflector device for fifth wheel tow vehicles that is removably installed on the cab of such a tow vehicle and includes a plurality of selectively adjustable deflector elements to redirect the air stream as it travels over the cab of the tow vehicle to drag created from said air stream flowing against the lead portion of the trailer. The present invention further includes a cargo storage chamber within the interior of the housing that is accessible by access doors disposed on the sides thereof.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

Figure 2:
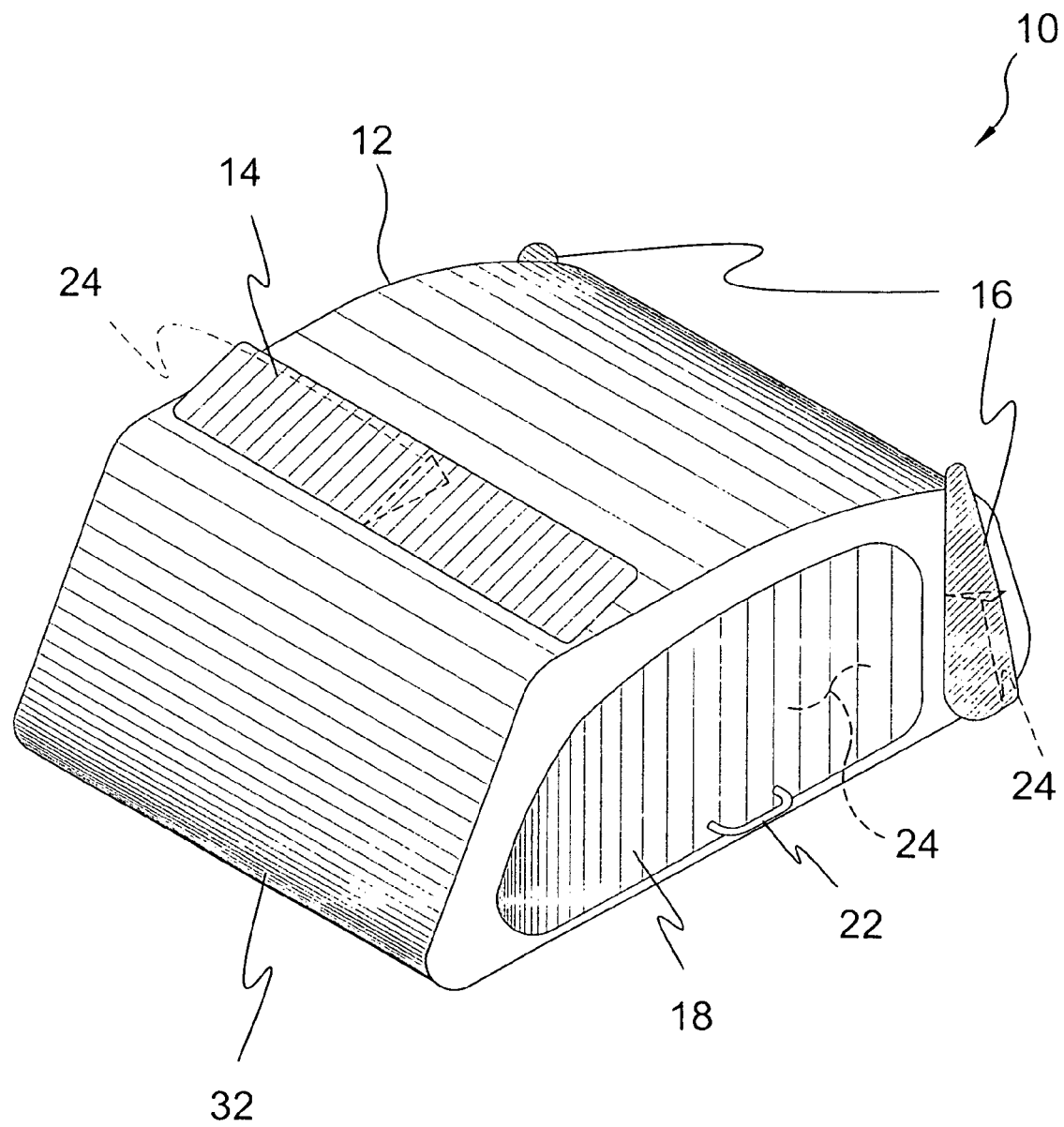
Figure 3:
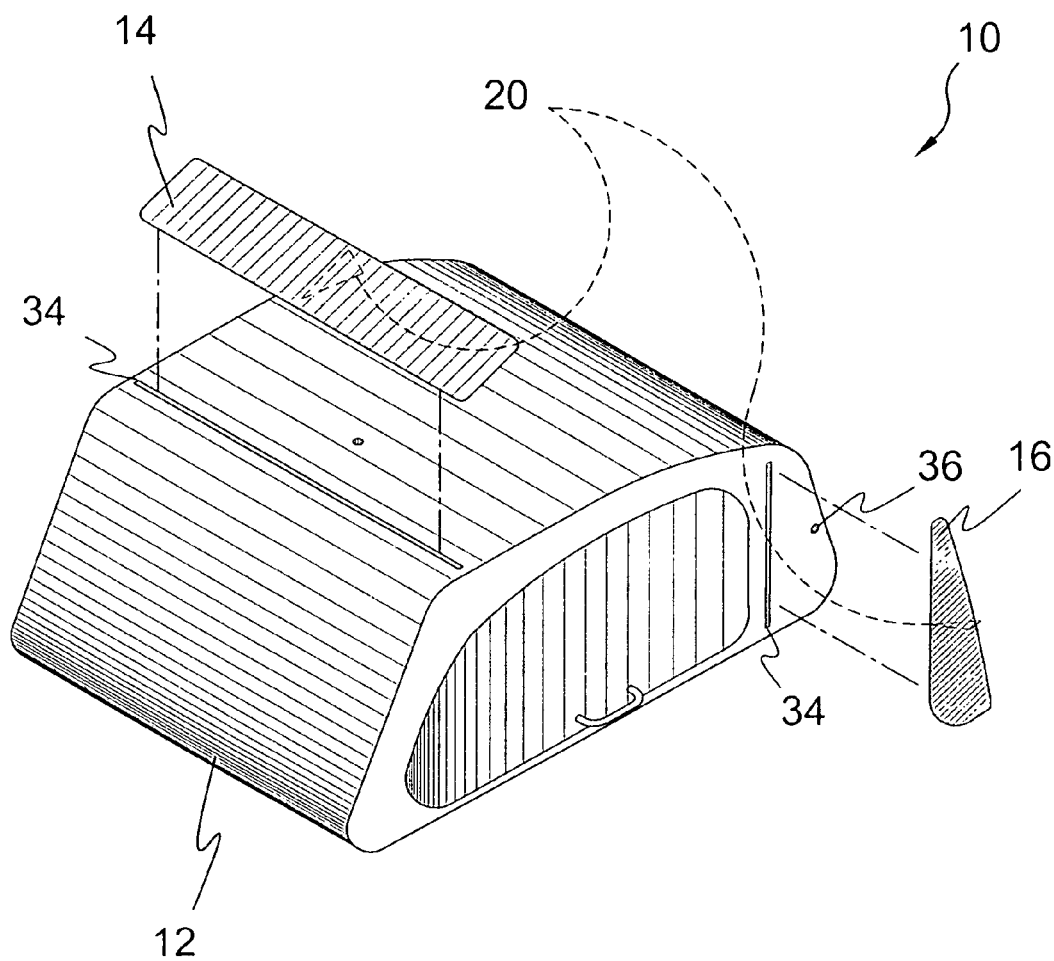
Figure 4:
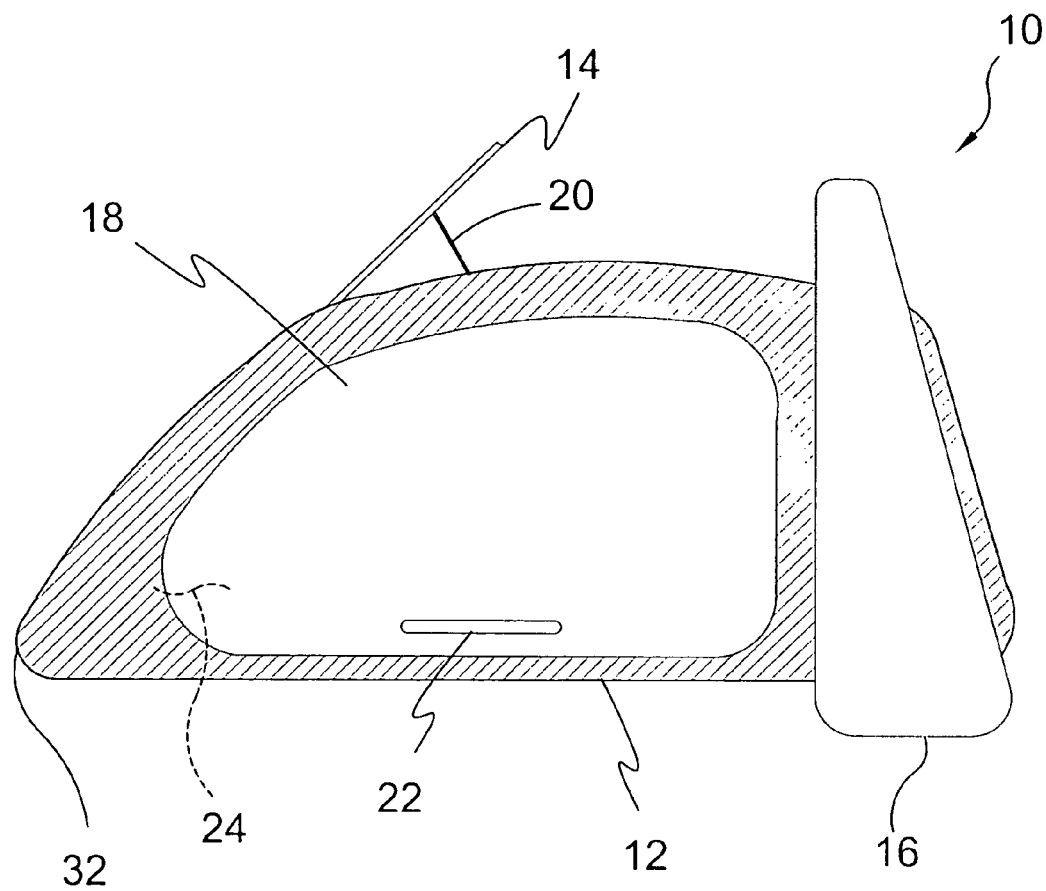
Figure 5:
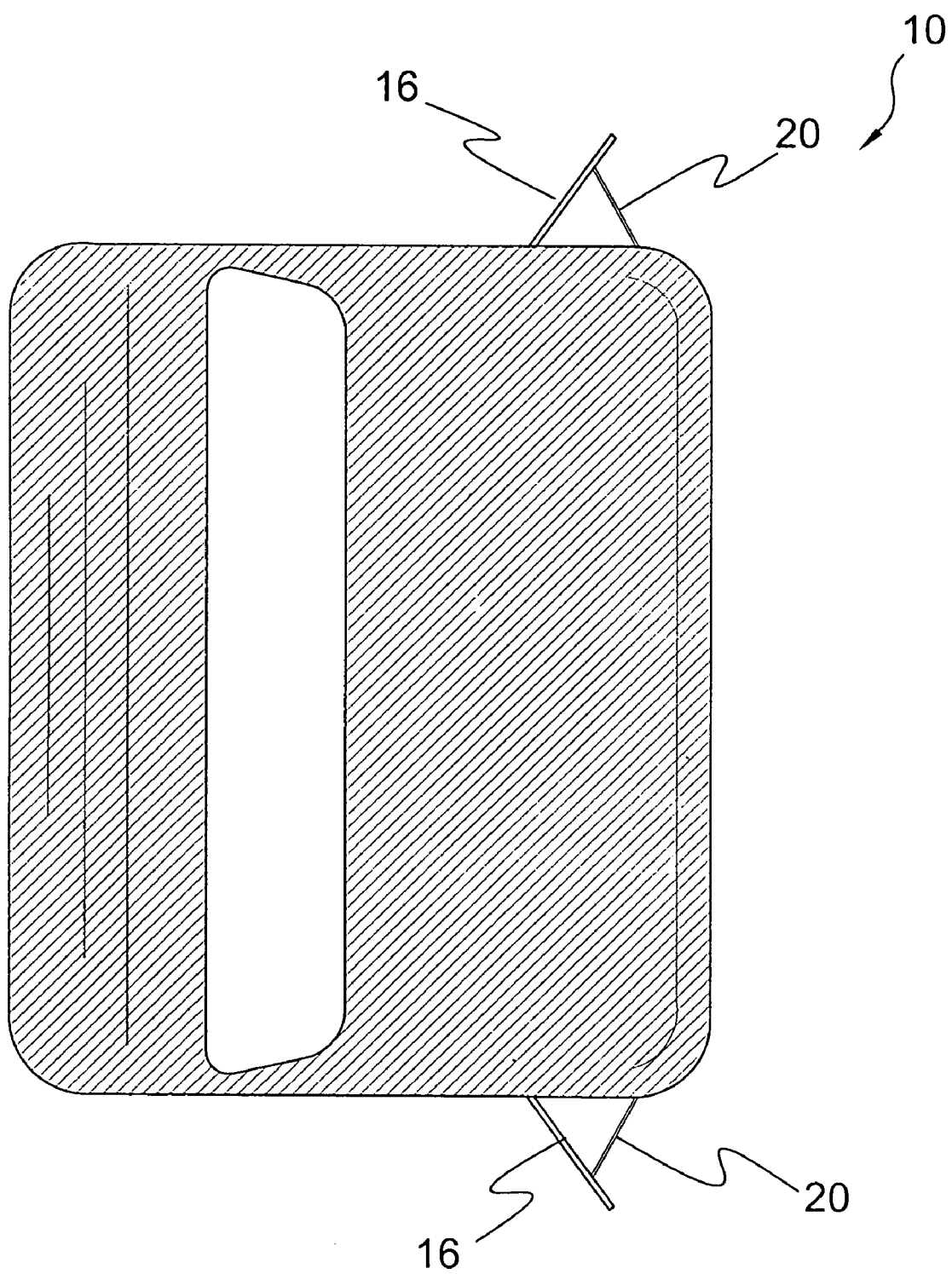
Figure 6:
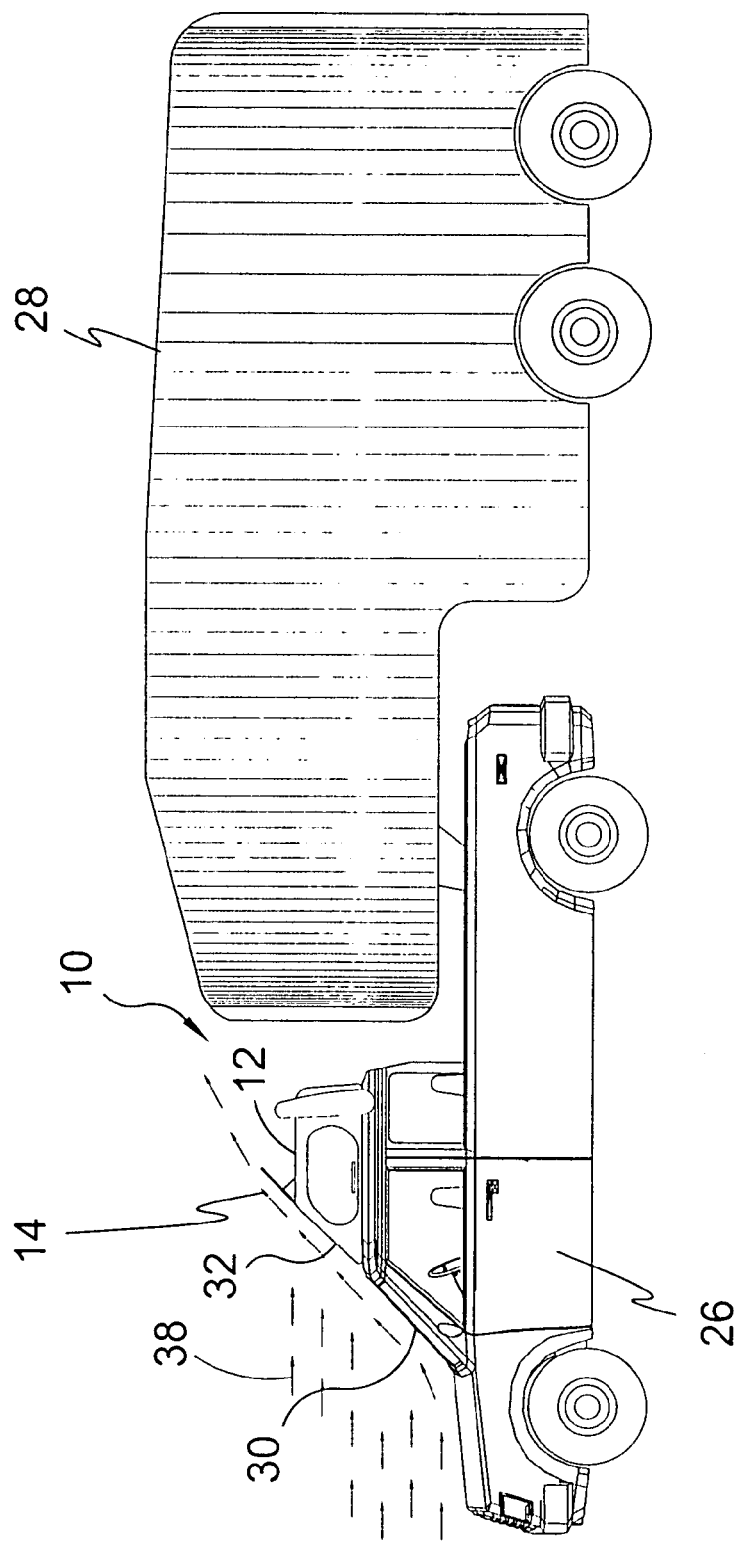
Figure 7:
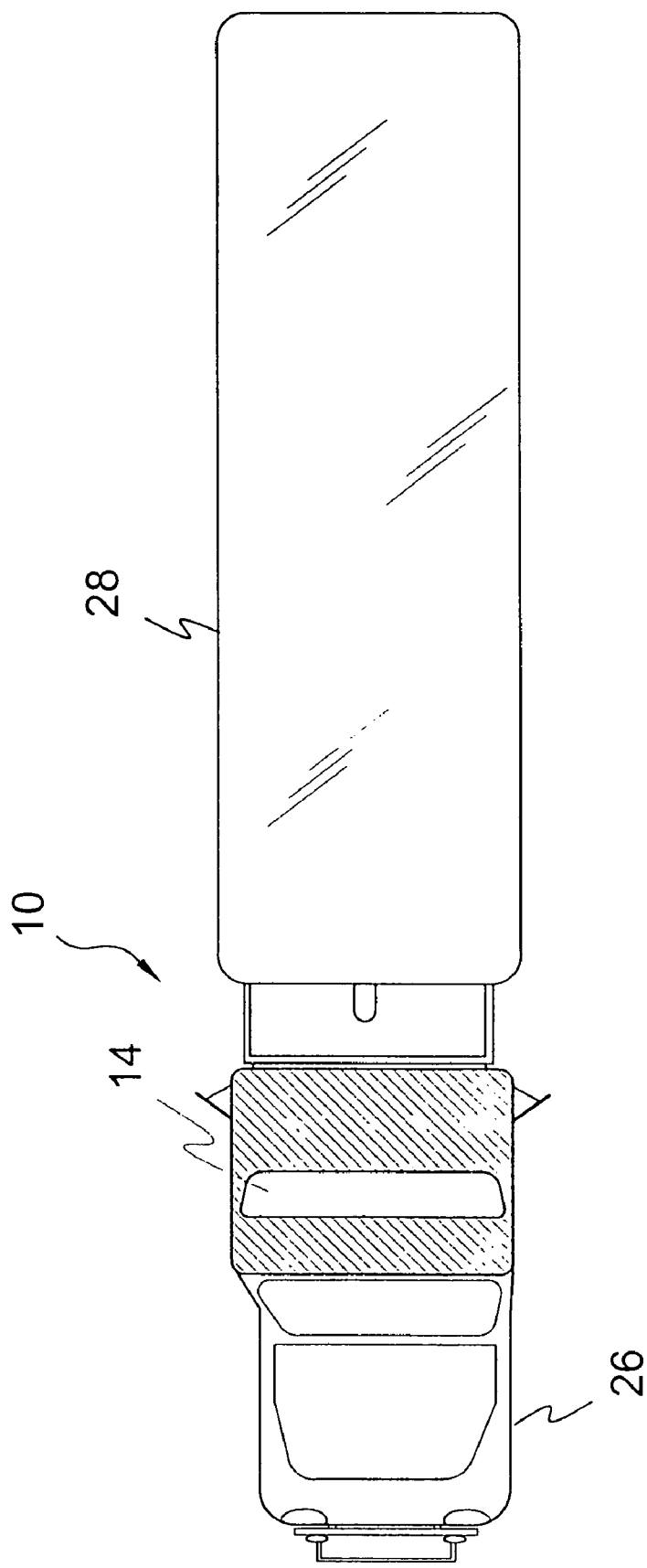

In order that the invention may be more fully understood, it will now be described, by way of example, with reference to the accompanying drawing in which:

FIG. 1 is an illustrative view of the present invention in use;
FIG. 2 is a perspective view of the present invention;
FIG. 3 is a perspective view of the present invention having the top and side deflector elements removed;
FIG. 4 is a side view of the present invention;
FIG. 5 is a top view of the present invention;
FIG. 6 is a side view the present invention in use; and
FIG. 7 is a top view of the present invention in use.

DESCRIPTION OF THE REFERENCED NUMERALS

Turning now descriptively to the drawings, in which similar reference characters denote similar elements throughout the several views, the figures illustrate the Cab Top Carrier/Deflector for Fifth Wheel Tow Vehicles of the present invention. With regard to the reference numerals used, the following numbering is used throughout the various drawing figures.

10 Cab Top Carrier/Deflector for Fifth Wheel Tow Vehicles of the present invention
12 housing
14 top deflector element
16 side deflector element
18 carrier access door
20 interchangeable deflector brace
22 handle of 18
24 cargo chamber of 12
26 tow vehicle
28 fifth wheel trailer
30 windshield of 26
32 sloped front end of 12
34 deflector anchor
36 brace anchor
38 air stream

DETAILED DESCRIPTION OF THE PREFERRED EMBODIMENT

The following discussion describes in detail one embodiment of the invention. This discussion should not be construed, however, as limiting the invention to those particular embodiments, practitioners skilled in the art will recognize numerous other embodiments as well. For definition of the complete scope of the invention, the reader is directed to appended claims.

FIG. 1 is an illustrative view of the present invention 10 in use. The present invention is a cab top carrier/deflector 10 for a tow vehicle 26 of fifth wheel and conventional travel trailers 28. The cab top carrier/deflector 10 comprises a housing 12, a top deflector element 14 and two side deflector elements 16 to assist in achieving a streamline effect. The slope and front of the housing 12 extend from the slope line of the tow vehicle windshield 30 and directs the airstream over and around the trailer 28. The housing 12 also provides storage within through access doors 18 disposed on each side thereof.

FIG. 2 is a perspective view of the present invention 10. Shown is the sloped front end 32 of the housing 12 which provides the transitional air flow deflection from the windshield of the top vehicle to the top deflector 14. The angular displacement of the air stream is manually adjusted by the user by changing the pitch of the top deflector 14 and side deflectors 16 through the use of an interchangeable pitch braces 20. The deflector elements 14,16 are adjusted accordingly as determined by the size of the trailer to maximize the effectiveness thereof to decrease wind resistance and improve gas mileage. A cargo chamber 24 is disposed in the interior of the housing 12 and accessible through access doors 18 situated on the sides thereof. The access doors 18 include a handle member 22 to assist the user in opening and closing the doors 18.

FIG. 3 is a perspective view of the present invention 10 having the deflector elements 14,16 removed. The deflector elements 14,16 are secured to the housing 12 with deflector anchors 34 disposed thereon and may be removed and stored when not in use. The interchangeable pitch braces 20 are secured to the housing 12 with brace anchors 36.

FIG. 4 is a side view of the present invention 10. Shown is the sloped front end 32 of the housing 12 which provides the transitional air flow deflection from the windshield of the top vehicle to the top deflector 14. The angular displacement of the air stream is manually adjusted by the user by changing the pitch of the top deflector 14 and side deflectors 16 through the use of an interchangeable pitch braces 20. The deflector elements 14,16 are adjusted accordingly as determined by the size of the trailer to maximize the effectiveness thereof to decrease wind resistance and improve gas mileage. A cargo chamber 24 is disposed in the interior of the housing 12 and accessible through access doors 18 situated on the sides thereof. The access doors 18 include a handle member 22 to assist the user in opening and closing the doors 18.

FIG. 5 is a top view of the present invention 10. Shown are the interchangeable pitch braces 20 maintaining a selected angular pitch of the side deflectors 16 relative to the housing 12 for deflecting air flow around the trailer. The pitch braces 20 may be replaced by others. of a different size to adjust the angular relation accordingly.

FIG. 6 is a side view the present invention 10 in use. Shown is the air stream 38 initially redirected by the windshield 30 of the tow vehicle 26 and then the sloped front end 32 of the housing 12 before reaching the top deflector 14. The top deflector 14 is adjusted to continue the deflection of the air stream 38 to overshoot the top of the trailer 28.

FIG. 7 is a top view of the present invention 10 mounted on the cab of a tow vehicle 26. Shown are the interchangeable pitch braces 20 maintaining a selected angular pitch of the side deflectors 16 relative to the housing 12 for deflecting air flow around the trailer 28. The pitch braces 20 may be replaced by others of a different size to adjust the angular relation accordingly.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention

What is claimed is new and desired to be protected by Letters Patent is set forth in the appended claims:

1. A cargo carrier and air stream deflector device for mounting on a cab of a towing vehicle to deflect air flow over and around an associated trailer to reduce drag and turbulence that can compromise performance of the tow vehicle and decrease fuel efficiency, said carrier/deflector device comprising:

a) a substantially hollow housing for mounting to the top of a cab of a vehicle for towing a trailer, said housing having a front wall, a top wall, a rear wall, and a pair of side walls, said front wall being sloped and positioned to continue a slope line of the windshield of the towing vehicle, wherein each of said side walls has an access door for entry into said cargo storage chamber;

b) a deflector element mounted on each of said top and side walls for redirecting airflow above and around said trailer to reduce drag applied thereto, wherein the top deflector element on said top wall is pivotally connected to said housing using a removable anchor on said top wall, the side deflector elements on said side walls are each pivoted on a removable anchor mounted on a side wall along a vertical axis between a rear edge of the access door and the rear wall of said housing, and said deflector elements are pivotally connected to said housing by means of deflector anchors; and c) a cargo storage chamber disposed within said housing.

2. The cargo carrier and air stream deflector device recited in claim 1, wherein distal edges of said deflector elements are angularly oriented towards a rear of said towing vehicle.

3. The cargo carrier and air stream deflector device recited in claim 2, wherein a pitch defining an angular relation between said housing and each of said deflector elements is variable.

4. The cargo carrier and air stream deflector device recited in claim 3, wherein the pitch of each said deflector element is manually selected by use of interchangeable pitch braces for selecting a desired angle of each deflector element, each pitch brace comprising a member having a shape to establish a desired pitch angle.

5. The cargo carrier and air stream deflector device recited in claim 4, wherein each said interchangeable pitch brace is secured to said housing with a brace anchor.

6. The cargo carrier and air stream deflector device recited in claim 5, wherein each said access door further includes a handle member to aid a user in the opening and closing thereof.

* * * * *